Dec. 17, 1968     C. B. STAHL, SR     3,416,498

ANIMAL FEEDING DEVICE

Filed June 29, 1966     4 Sheets-Sheet 1

Chester B. Stahl, Sr.
INVENTOR.

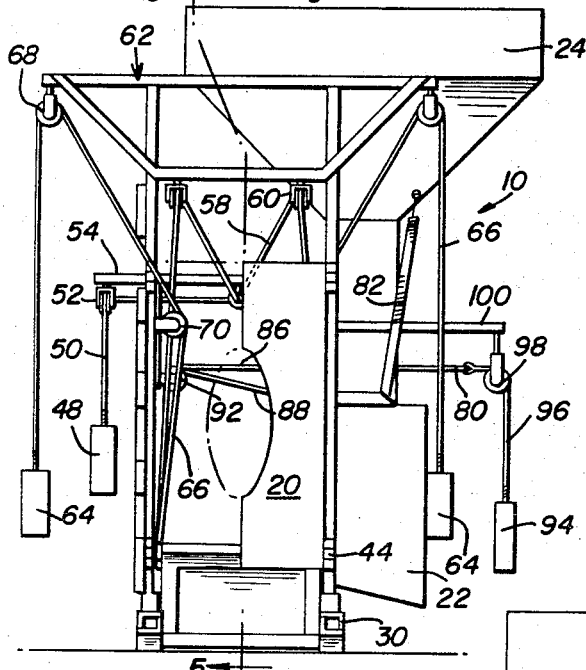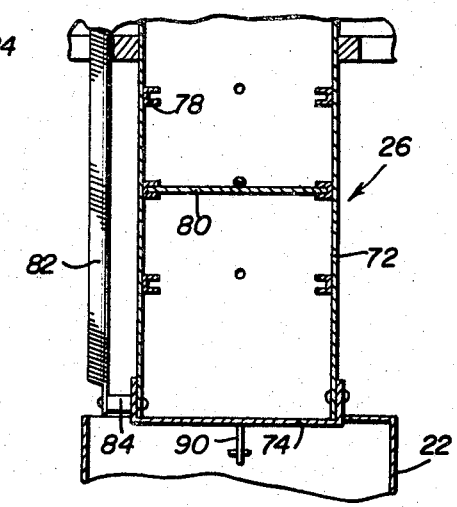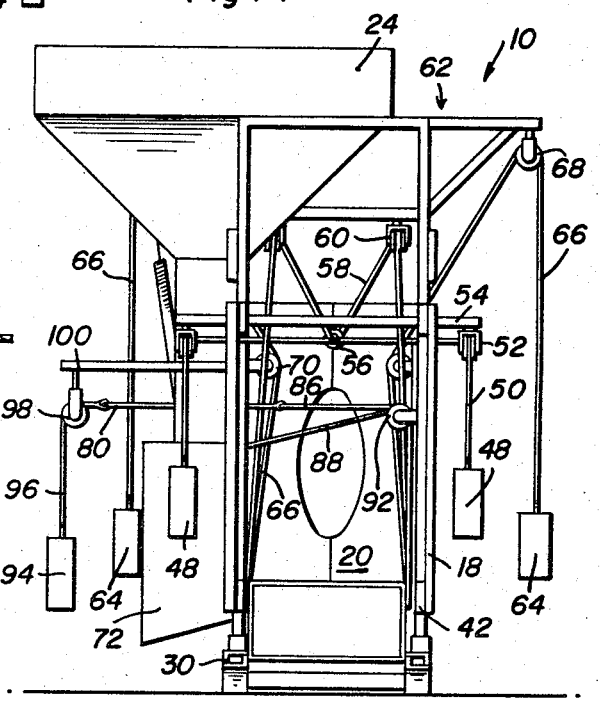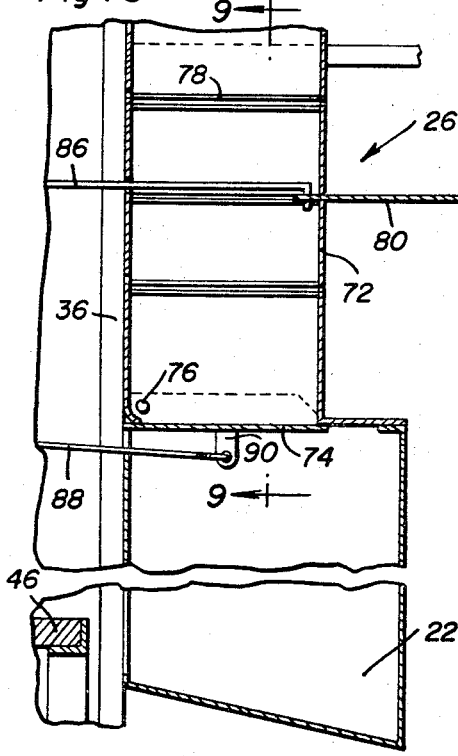

Dec. 17, 1968  C. B. STAHL, SR  3,416,498
ANIMAL FEEDING DEVICE
Filed June 29, 1966  4 Sheets-Sheet 3

Chester B. Stahl, Sr.
INVENTOR.

BY *Clarence A. O'Brien*
and *Harvey B. Jacobson*
Attorneys

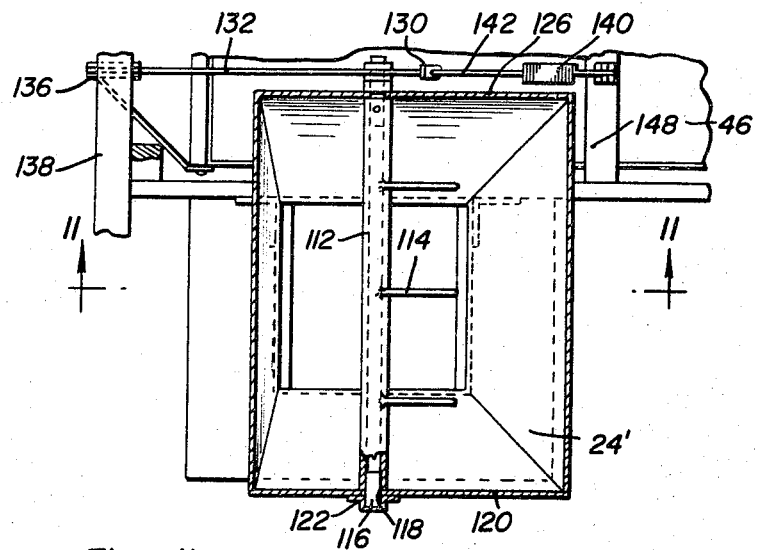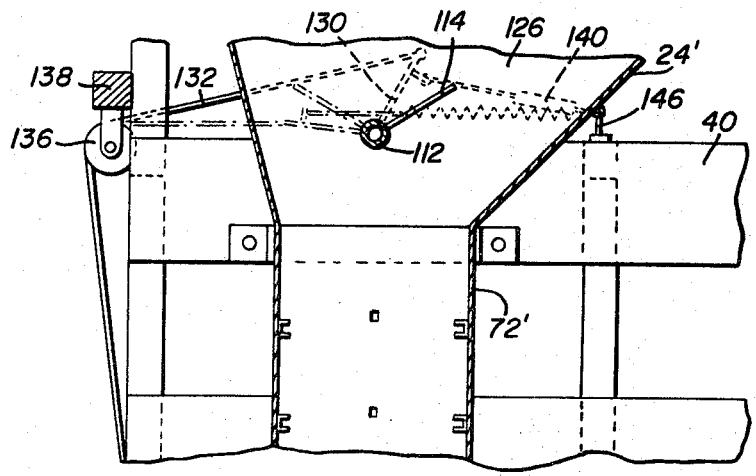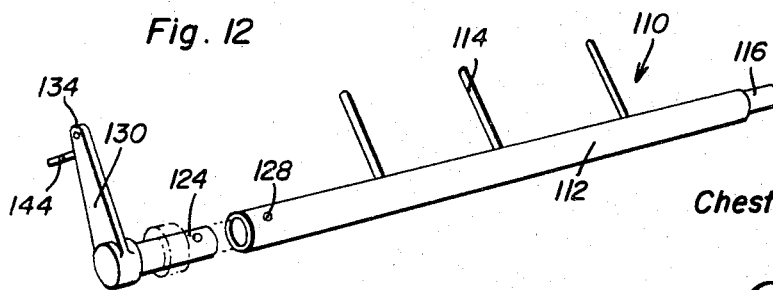

United States Patent Office 3,416,498
Patented Dec. 17, 1968

3,416,498
ANIMAL FEEDING DEVICE
Chester B. Stahl, Sr., Rte. 1, Trenton, Ky. 42286
Filed June 29, 1966, Ser. No. 561,589
2 Claims. (Cl. 119—55)

ABSTRACT OF THE DISCLOSURE

A feeding stall having oppositely disposed entrance and exit gates and a feed receptacle attached to a lateral wall therein. A treadle board is disposed substantially between the gates, the board being pivotally secured to the stall at the entrance gate end. The opposite end of the board is caused to pivot downwardly upon entrance of an animal which in turn causes closing of the entrance gate and operation of feed metering means.

This invention relates to the feeding of animals such as hogs and cattle and more particularly to apparatus for controllably feeding livestock animals.

An important object of the present invention is to provide an economical piece of equipment for livestock farmers whereby livestock animals may be automatically fed a preselected quantity of feed in response to the weight of an animal entering a feeding stall and also agitating the feed in a supply hopper or bin to prevent lodging or sticking of certain feed in the bin.

An additional object of the present invention is to provide an animal feeding stall of such construction and arrangement as to automatically dispense a preselected quantity of feed upon entrance of an animal without frightening of the animal.

A still further object of the present invention is to provide an animal feeding device of the aforementioned type having a weight responsive supporting floor for automatically operating a dispensing mechanism supplying a predetermined quantity of feed and at the same time closing a normally open entrance gate through which the animal enters into the feeding stall in order to prevent entrance of another animal until the previous animal has been fed and has exited from the feeding stall.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a front elevational view of the apparatus shown in FIGURES 1 and 2.

FIGURE 4 is a rear elevational view of the apparatus.

FIGURE 8 is an enlarged partial sectional view taken substantially through a plane indicated by section line 8—8 in FIGURE 2.

FIGURE 9 is a partial sectional view taken substantially through a plane indicated by section line 9—9 in FIGURE 8.

FIGURE 10 is a fragmentary top plan view of a bin with a feed agitator disposed therein.

FIGURE 11 is a vertical sectional view taken along section line 11—11 of FIGURE 10 illustrating the relation of the agitator to the bin.

FIGURE 12 is a perspective view of the agitator.

Figure 1:
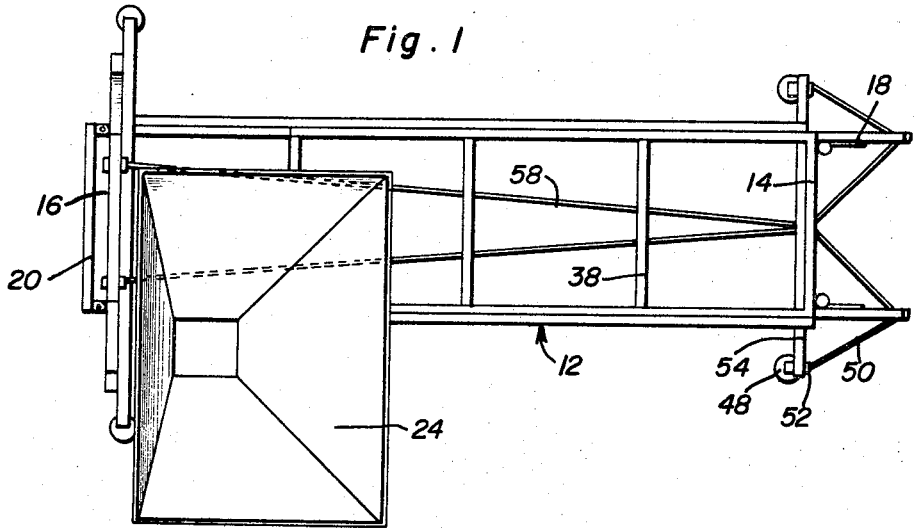
FIGURE 1 is a top plan view of the animal feeding apparatus of the present invention.
Figure 2:
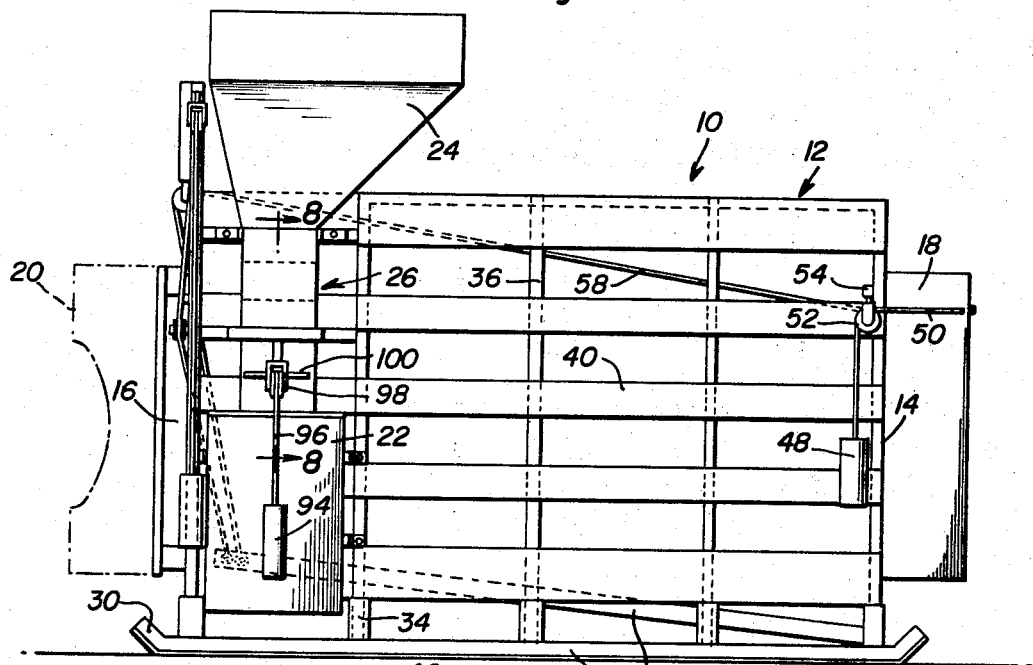
FIGURE 2 is a side elevational view of the apparatus shown in FIGURE 1.
Figure 7:
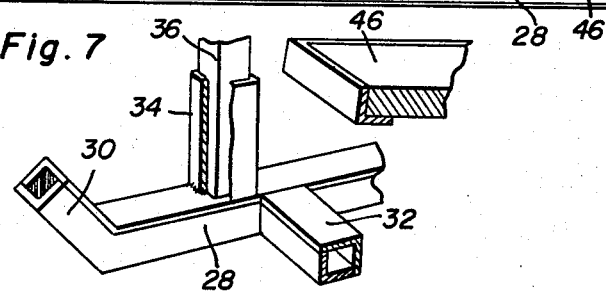
FIGURE 7 is an enlarged perspective view of a portion of the apparatus.

Referring now to the drawings in detail, FIGURES 1 through 4 illustrate the feeding apparatus generally denoted by reference numeral 10. The apparatus includes an elongated stall assembly generally referred to by reference numeral 12 having opposite ends 14 and 16 as more clearly seen in FIGURES 1 and 2 through which a livestock animal enters and exits. The stall mounts at the entrance end 14, a pair of normally opened gates 18 while a pair of normally closed gates 20 are mounted at the exit end. A feed bin or receptacle 22 is laterally mounted on the stall adjacent the exit end as shown in FIGURES 2, 3 and 4 so that the livestock animal may have access to any feed supplied thereto when the animal is completely within the stall. A predetermined quantity of feed is therefore dispensed into the feed bin 22 from a hopper 24 through a metering mechanism generally referred to by reference numeral 26. As will be explained hereafter, when the livestock animal has completely entered the stall 12, the entrance gates 18 close and the metering mechanism 24 is rendered operative to dispense a preselected quantity of feed into the feeding bin 22. After feeding has been completed, the exit gates 20 are selectively opened so the animal may leave the feeding stall 12, whereupon the entrance gates 18 open once again and the metering mechanism 26 is reset in preparation for the feeding of another animal.

Figure 6:
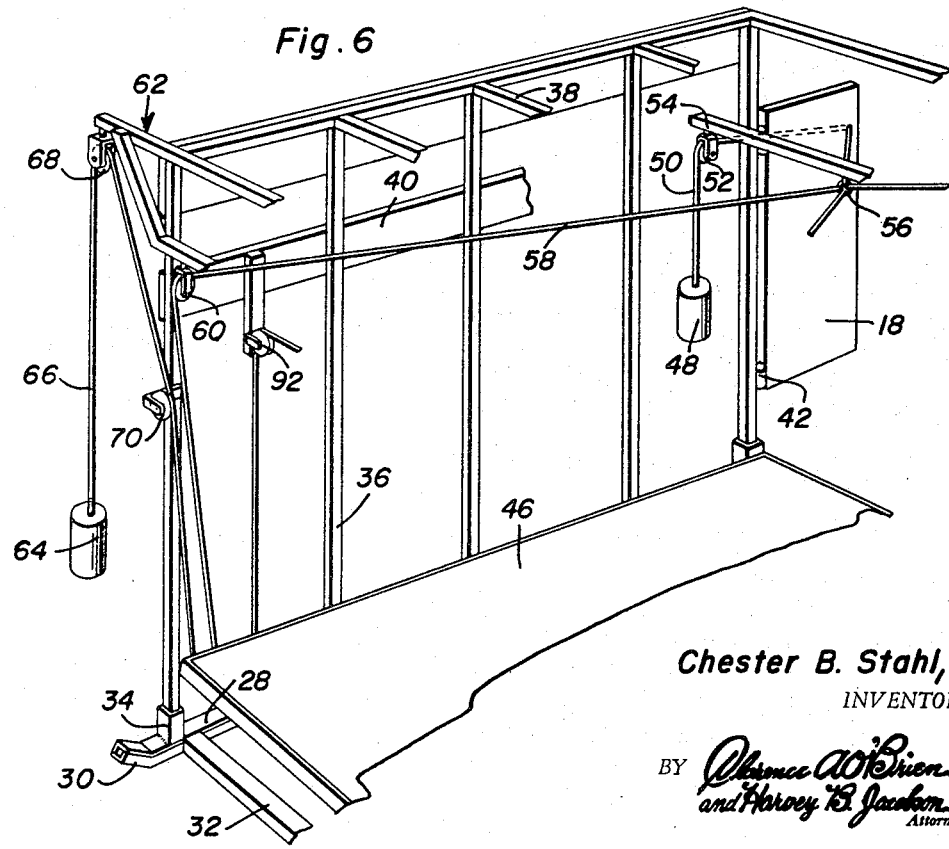
FIGURE 6 is a partial perspective view of the apparatus.

The feeding stall 12 is constructed so that it may be readily moved from one location to another. Toward this end, the feeding stall includes a pair of elongated parallel spaced skid frame members 28 having upturned end portions 30 at the opposite longitudinal ends. The frame members are interconnected in parallel spaced relation to each other by a plurality of cross frame members 32 and mount a plurality of longitudinally spaced sockets 34 which received vertically elongated posts 36 interconnected at the upper ends by the top cross frame members 38. A plurality of vertically spaced boards 40 are secured to the vertical posts 36 so as to form the side walls for the stall between which the livestock animal is confined. The posts at the entrance end mount hinges 42 as shown in FIGURES 4 and 6 so as to pivotally mount the entrance gates 18 whereas the posts at the exit end mount hinges 44 in order to pivotally mount the exit gates 20. The hinges 44 may also include spring mechanisms yieldably holding the exit gates in the closed positions.

Figure 5:
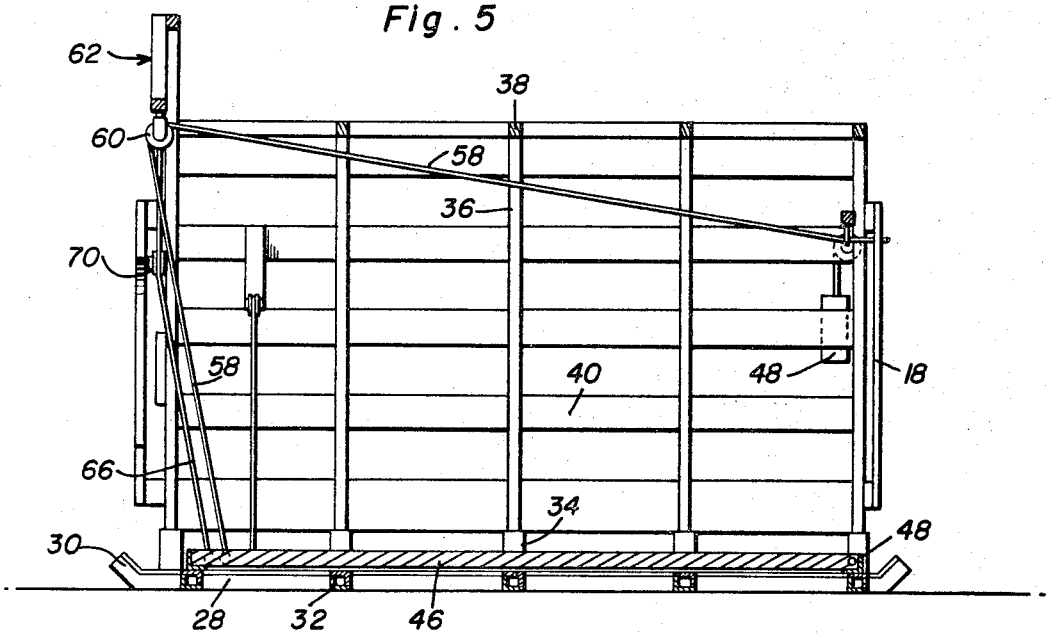
FIGURE 5 is a sectional view taken substantially through a plane indicated by section line 5—5 in FIGURE 3.

As more clearly seen in FIGURES 2, 5 and 6, a weight sensing, supporting floor 46 is pivotally mounted by means of a hinge 48 at the entrance end extending therefrom toward the exit end. The supporting floor is normally held in a raised position as shown in FIGURES 2 and 6 spaced above the cross frame members 32 on which it is supported in the loaded position shown in FIGURE 5. It will therefore be apparent, that the supporting floor 46 will support the livestock animal thereon between the side walls of the feeding stall in the position shown in FIGURE 5 to which it is displaced. It is this pivotal displacement of the supporting floor that both closes the entrance gates 18 and renders the metering mechanism 26 operative to dispense a preselected quantity of feed into the feeding bin 22.

As shown in FIGURES 2, 4 and 6, the entrance gates 18 are biased to the open position by means of a pair of weights 48, each weight being connected to one end of a cable 50 the opposite end of which is connected to the entrance gates 18 in spaced relation to the hinges 42. Accordingly, each of the cables 50 is entrained about a pulley wheel 54 suspended from the ends of a supporting frame member 54 secured to the vertical posts at the entrance end and extending laterally therebeyond. The pulley supporting frame member 54 also mounts intermediate the ends thereof, a guide ring element 56 through which a pair of cables 58 extend, the cables 58 being connected to the entrance gates 18 adjacent to the cables 50 but on the opposite sides of the gates. The ends of the cables 58 opposite the ends to which the gates 18 are connected, are anchored to the opposite lateral sides of the supporting floor platform 46 adjacent to the exit end of the feeding stall. Accordingly, the cables 58 are entrained about pulleys 60 suspended from a pulley supporting structure 62 which also extends laterally beyond the side walls of the stall. The pulleys 60 guide the cables 58 horizontally from the guide ring 56 and downwardly toward the supporting floor 46 alongside of the vertical posts at the exit end of the stall. It will therefore be apparent, that downward pivotal movement of the supporting floor will exert a pull on the cables 58 closing the entrance doors 18 against the bias of the weights 48 which normally hold them open. The supporting platform 46 is also biased to its upper position shown in FIGURES 2 and 6 by means of a pair of weights 64, each weight 64 being connected to one end of a cable 66, the opposite ends of the cables 66 being anchored to the supporting floor adjacent to the locations at which the cables 58 are anchored. The pulley supporting structure 62 therefore mounts a pair of pulley wheels 68 at the opposite lateral ends thereof about which the cables 66 are entrained, the cables 66 also being engaged with the guide pulleys 70 mounted intermediate the ends of the vertical posts at the exit end. Although weight biasing devices are described in connection with the entrance gates 18 and the supporting floor 46, it will be appreciated that they may be replaced by spring devices.

Referring now to FIGURES 8 and 9 in particular, it will be observed that the metering mechanism 26 includes a vertical gravity chute 72 having an upper end connected to the feed storing hopper 24 and a lower outlet end from which feed is dispensed into the feed bin 22. The lower outlet end is therefore normally closed by a feed drop gate 74 pivotally mounted by the pivots 76 on the chute 72 adjacent the lower outlet end. Also mounted intermediate the upper inlet and lower outlet ends of the chute 72, are a plurality of pairs of vertically spaced tracks 78. A metering plate 80 is adapted to be slidably mounted between one pair of tracks 78 so that it may be displaced between a flow blocking position entirely within the chute and another position unblocking flow as shown in FIGURE 8. When feed is stored within the hopper 24, it will therefore be apparent that the feed will completely fill the gravity chute 72 and be held therein by means of the drop gate 74 biased to its closed position by means of the spring 82 one end of which is connected to the drop gate adjacent its forward end by a laterally extending anchor 84 while the opposite end is anchored to any suitable stationary location such as the hopper as shown in FIGURE 3.

When the animal enters the feeding stall causing downward movement of the supporting floor 46, the metering plate 80 is slidably displaced to a position blocking flow through the chute 72 while the drop gate 74 is opened so as to dispense all of the feed below the metering plate 80 into the feeding bin 22. Operating facilities are therefore provided which include a cable 86 connected to one of the metering plate 80 within the chute and a cable 88 connected at one end to the drop gate 74 by means of a downwardly depending anchor 90. The cables 86 and 88 extend across the stall and are entrained about the pulley 92 so that they may extend downwardly therefrom for anchoring to the supporting floor 46. Downward displacement of the supporting floor will therefore simultaneously displace the metering plate 80 to a closed position and open the drop gate 74. The quantity of feed dispensed into the feeding bin will therefore depend upon the pair of tracks 78 between which the metering plate 80 is installed. Also, the metering plate is normally held in its open position when the supporting floor is unloaded, by means of a weight 94 connected to one end of a cable 96, the opposite end of which is connected to the metering plate 80 opposite to the end at which the cable 86 is connected. The cable 96 is therefore entrained about a pulley 98 suspended from a pulley supporting member 100 which extends laterally from the chute 72. It will also be appreciated, that the metering plate 80 may be biased to its open position by means of a spring device rather than the weight device described.

From the foregoing description, the construction, operation and utility of the animal feeding apparatus of the present invention will be apparent. It will therefore be appreciated, that operation of the animal feeding device is automatic and utilizes the load of the animal itself for this purpose rather than some external source of power such as an electrical supply. The cost and operation of the animal feeding device will therefore render it economically feasible. Furthermore, the arrangement of the apparatus is such as to encourage entry and feeding of the animals one at a time. When feeding is completed, the animal may be released from the feeding stall by opening of the exit gates 20 in any suitable manner whether it be by some supervisory personnel or by means of some time control mechanism for example.

FIGURES 10, 11 and 12 illustrate a structure which may be incorporated into a hopper 24' which is substantially the same as the hopper 24 illustrated in FIGURES 1–9. When dispensing or metering certain types of feed, the feed will have a tendency to bridge or lodge in the lower end of the hopper or bin where it enters the chute 72'. In order to preclude this bridging of the material or jamming of the bin or hopper 24', an agitator assembly 110 is provided which is in the form of a hollow pipe or tubular member 112 extending transversely across the hopper or bin 24' in generally horizontal relation and perpendicular to the longitudinal axis of the gravity chute 72' with the longitudinal axis of the agitator tubular member 112 being generally in alignment with the center of the gravity chute 72'. The tubular member or pipe 112 is provided with a plurality of radially extending, longitudinally aligned and spaced fingers 114 which may also be small tubular pipes or the like or solid fingers for agitating the material in the hopper or bin 24'. For convenience of construction, the tubular member or pipe 112 may have a plurality of threaded holes therein and the fingers 114 may be small lengths of pipe threaded into the threaded holes in the tubular member or pipe 112.

One end of the tubular member or pipe 112 is provided with a reduced bearing rod 116 secured thereto and projecting through a hole 118 in one wall 120 of the hopper or bin 24'. A bearing cap 122 may be provided for the end of the rod or stub shaft 116.

The other end of the tubular member or pipe 112 has a stub shaft or rod 124 extending through a suitable hole in an opposite wall 126 of the bin 24'. A suitable fastener or pin may be inserted through aligned openings 128 in the pipe 112 and stub shaft 124 for rigidly securing the stub shaft 24 to the agitator pipe 112. The end of the stub shaft 124 disposed exteriorly of the bin 24' is provided with a laterally extending operating arm 130 which is rigid therewith and which turns with the agitator pipe 112.

Connected to the outer end of the arm 130 is a flexible cable 132 connected to an aperture 134 in the end of the arm 130. The cable 132 is entrained over a pulley 136 supported by a frame member 138 and the cable 132 then extends downwardly and is connected to the animal supporting floor such as 46 illustrated in FIGS. 1–9.

Also attached to the arm 130 adjacent the other end thereof and extending in the opposite direction is a tension coil spring 140 which has a straight end portion 142 connected to an eye member 144 fixed to the arm 130 adjacent the outer end thereof. The other end of the tension spring 140 is attached to an eye member 146 secured to another frame member 148. Thus, the spring 140 will bias the agitating pipe 112 and fingers 114 to a position illustrated in FIGURE 11 when no tension is exerted by the cable 132 so that the fingers 114 generally point towards one of the walls of the bin 24' and the outer end of the fingers 114 generally are aligned with one wall of the vertical chute 72'. Then when the supporting board 46 is depressed such as when an animal enters the stall, the cable 132 will of course be moved downwardly thus swinging the agitator pipe 112 and the fingers 114 about the rotational axis of the agitator pipe 112 thus moving the fingers 114 to the dotted line position in FIGURE 11 where the outer ends thereof are generally in vertical alignment with the opposite wall of the chute 72' thus positively agitating the material in the hopper or bin 24' and preventing any possibility of such material bridging over or lodging in the lower tapering end of the hopper or bin 24'. Insofar as the remainder of the structure illustrated in FIGURES 10-12 is concerned, it is the same as the structure illustrated in FIGURES 1-9. In fact, the agitator structure may be incorporated directly into the structure illustrated in FIGURES 1-9 although it is pointed out that in some instances, the agitator would not be necessary. The need for the agitator will be determined by the type of material being used as feed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal feeding stall having an animal weight sensing means comprising a normally opened entrance gate, first pulley means having a cable entrained thereover, said cable having a weight attached at one end thereof, the opposite cable end being attached to said sensing means, an intermediate point on said cable being attached to said gate thereby retaining the latter in a normally opened position, entrance of an animal causing actuation of said sensing means in opposition to said gate, a feed receptacle within reach of an enclosed animal, gravity chute means having a lower outlet end above the feed receptacle, a feed drop gate movably mounted on the chute closing said lower outlet end, metering means movably mounted by the chute in a first biased position allowing a flow of feed to fill a chute portion between said metering means and said feed drop gate, means connecting said metering means to said sensing means for moving said metering means to a second position blocking the feed flow into said chute portion, and means connecting the feed drop gate to the sensing means for opening the drop gate to dispense a preselected quantity of feed into said receptacle simultaneously with the movement of the metering means to said second position.

2. The apparatus set forth in claim 1 wherein said metering means includes a supply hopper, an agitator assembly disposed adjacent the bottom of the supply hopper, and means connected to the agitator assembly and said sensing means for operating the agitator assembly in response to entry of an animal into the stall.

References Cited

UNITED STATES PATENTS

| 233,888 | 11/1880 | Snell | 119—55 |
| 1,449,485 | 3/1923 | Alspach | 119—55 |
| 2,814,271 | 11/1957 | Black | 119—55 |

HUGH R. CHAMBLEE, *Primary Examiner.*